(12) United States Patent
Thornes et al.

(10) Patent No.: US 8,223,298 B2
(45) Date of Patent: Jul. 17, 2012

(54) LCD BASED POLARIZATION, PHASE AND AMPLITUDE SPATIAL LIGHT MODULATOR

(75) Inventors: Joshua J. Thornes, Albuquerque, NM (US); Robin A. Reeder, El Segundo, CA (US); Steven R. Wilkinson, Stevenson Ranch, CA (US)

(73) Assignee: Raytheon Company, Waltham, MA (US)

( * ) Notice: Subject to any disclaimer, the term of this patent is extended or adjusted under 35 U.S.C. 154(b) by 469 days.

(21) Appl. No.: 12/487,182

(22) Filed: Jun. 18, 2009

(65) Prior Publication Data

US 2010/0321615 A1    Dec. 23, 2010

(51) Int. Cl.
*G02F 1/1335* (2006.01)
*G02F 1/1347* (2006.01)
*G02F 1/01* (2006.01)

(52) U.S. Cl. ............... 349/99; 349/96; 349/74; 349/83; 359/238

(58) Field of Classification Search .............. 349/99, 349/96, 74, 83; 359/238
See application file for complete search history.

(56) References Cited

U.S. PATENT DOCUMENTS

| | | | |
|---|---|---|---|
| 6,577,782 B1 * | 6/2003 | Leaird et al. | 385/15 |
| 7,576,907 B1 * | 8/2009 | Bartels et al. | 359/298 |

OTHER PUBLICATIONS

Weiner "Femtosecond pulse shaping using spatial light modulators" Review of Scientific Instruments. vol. 71,No. 5, May 2000, American Institute of Physics,pp. 1929-1960.*
Dorrer et al. "Progammable Phase Control of Femtosecond Pulses by Use of a Nonpixelated Spatial Light Modulator", Optics Letters, vol. 23, No. 9, May 1, 1998, Optical Society of America, pp. 709-711.
Weiner "Femtosecond Pulse Shaping Using Spatial Light Modulators", Review of Scientific Instruments, vol. 71, No. 5, May 2000, American Institute of Physics, pp. 1929-1960.
Brixner et al. "Femtosecond Polarization Pulse Shaping", Optics Letters, vol. 26, No. 8, Apr. 15, 2001, Optical Society of America, pp. 557-559.
Polachek et al. "Full Control of the Spectral Polarization of Ultrashort Pulses", Optics Letters, vol. 31, No. 5, Mar. 1, 2006, Optical Society of America, pp. 631-633.
Ninck et al. "Programmable Common-Path Vector Field Synthesizer for Femtosecond Pulses", Optics Letters, vol. 32, No. 23, Dec. 1, 2007, Optical Society of America, pp. 3379-3381.

* cited by examiner

*Primary Examiner* — Mike Qi
(74) *Attorney, Agent, or Firm* — Lando & Anastasi, LLP

(57) ABSTRACT

An optical pulse shaper includes an optical delay line; a spatial light modulator placed at the Fourier plane of the optical delay line having a spectral amplitude spatial light modulator; a spectral phase and polarization ellipticity spatial light modulator; and a spectral polarization rotator; and a controller configured to independently control an amplitude, a phase and polarization ellipticity, and a linear polarization of an optical pulse. A method for shaping an optical pulse is also provided.

20 Claims, 3 Drawing Sheets

LCD BASED POLARIZATION, PHASE AND AMPLITUDE SPATIAL LIGHT MODULATOR

BACKGROUND

The application generally relates to temporal shaping and polarization state modification of ultrashort optical pulses.

The temporal shaping of ultrafast pulses is a field that has seen considerable growth alongside the development of ultrafast laser pulse sources since the 1980s. A conventional apparatus for ultrafast pulse shaping is a Fourier-domain pulse shaper, which performs a real space Fourier-transform on an input pulse, allowing for modification of the frequency components of the pulse. A variety of modulators can be placed at the Fourier plane of the pulse shaper, including liquid crystal arrays.

A conventional approach to building an optical delay line for frequency-domain pulse shaping is to use diffraction gratings as the dispersive elements and transmissive lenses as the focusing optics. They are then put into the "zero-dispersion" pulse compressor configuration, resulting in a Fourier plane between the two focusing elements where the frequency components of the input pulse are resolved, and then modulated. However, this approach only permits controlling frequency on a pulse-by-pulse basis.

Single layer liquid crystal arrays placed at the Fourier plane have been used to modulate the phase of the frequency components of a pulse, or be used to modulate the amplitude of the pulse. In addition, it is known to place dual layer liquid crystal arrays at the Fourier plane to modulate the phase, amplitude or polarization ellipticity of the pulse.

However, to control the full spectral amplitude, phase and polarization control using a single Fourier-domain pulse shaper requires dividing the input pulse into multiple paths and configuring the pulse shaper such that they address different portions of the spatial light modulator.

SUMMARY

According to an embodiment, an optical pulse shaper includes an optical delay line; a spatial light modulator placed at the Fourier plane of the optical delay line having a spectral amplitude spatial light modulator; a spectral phase and polarization ellipticity spatial light modulator; and a spectral polarization rotator; and a controller configured to independently control an amplitude, a phase and a polarization of an optical pulse.

According to an aspect of an embodiment, a method for shaping an optical pulse includes independently controlling an amplitude, a phase and a polarization of an optical pulse using the above-described optical pulse shaper.

Other features and advantages of one or more embodiments of the present application will seem apparent from the following detailed description, and accompanying drawings, and the appended claims.

BRIEF DESCRIPTION OF THE DRAWINGS

Embodiments of the present application will now be disclosed, by way of example only, with reference to the accompanying schematic drawings in which corresponding reference symbols indicate corresponding parts, in which.

DETAILED DESCRIPTION

The disclosed embodiments seek to improve upon existing polarization pulse shapers by providing full amplitude, phase and polarization control over the frequency components of the pulse, for a single pulse without requiring separating the pulse along multiple paths and addressing different areas of a spatial light modulator. This allows for more compact packaging and more stable configurations and could reduce alignment error.

According to one or more embodiments, a spatial light modulator may be positioned at the Fourier plane of a dispersive optical delay line that includes several arrays of individually addressable liquid crystal light modulator elements, combined with several linear polarizers and quarter-wave retardance waveplates. The input pulse may separated into frequency components by the input dispersive element, which are focused at the Fourier plane of the optical delay line. The spatial light modulator, under electronic control then modifies the retardance of the liquid crystal array elements to control the amplitude, phase and polarization state of the frequency components passing through them. These components are subsequently recombined on the output dispersive elements to form an optical pulse with synthesized amplitude, phase and polarization characteristics.

The embodiments disclosed herein may be used for modulating pixelated arrays, as well as non-pixelated arrays. See, e.g., C. Dorrer et al. "Programmable phase control of femtosecond pulses by use of a nonpilxelated spatial light modulator," Opt. Lett. Vol. 23, No. 9, pp. 709-711 (1998), herein incorporated by reference in its entirety.

Figure 1:
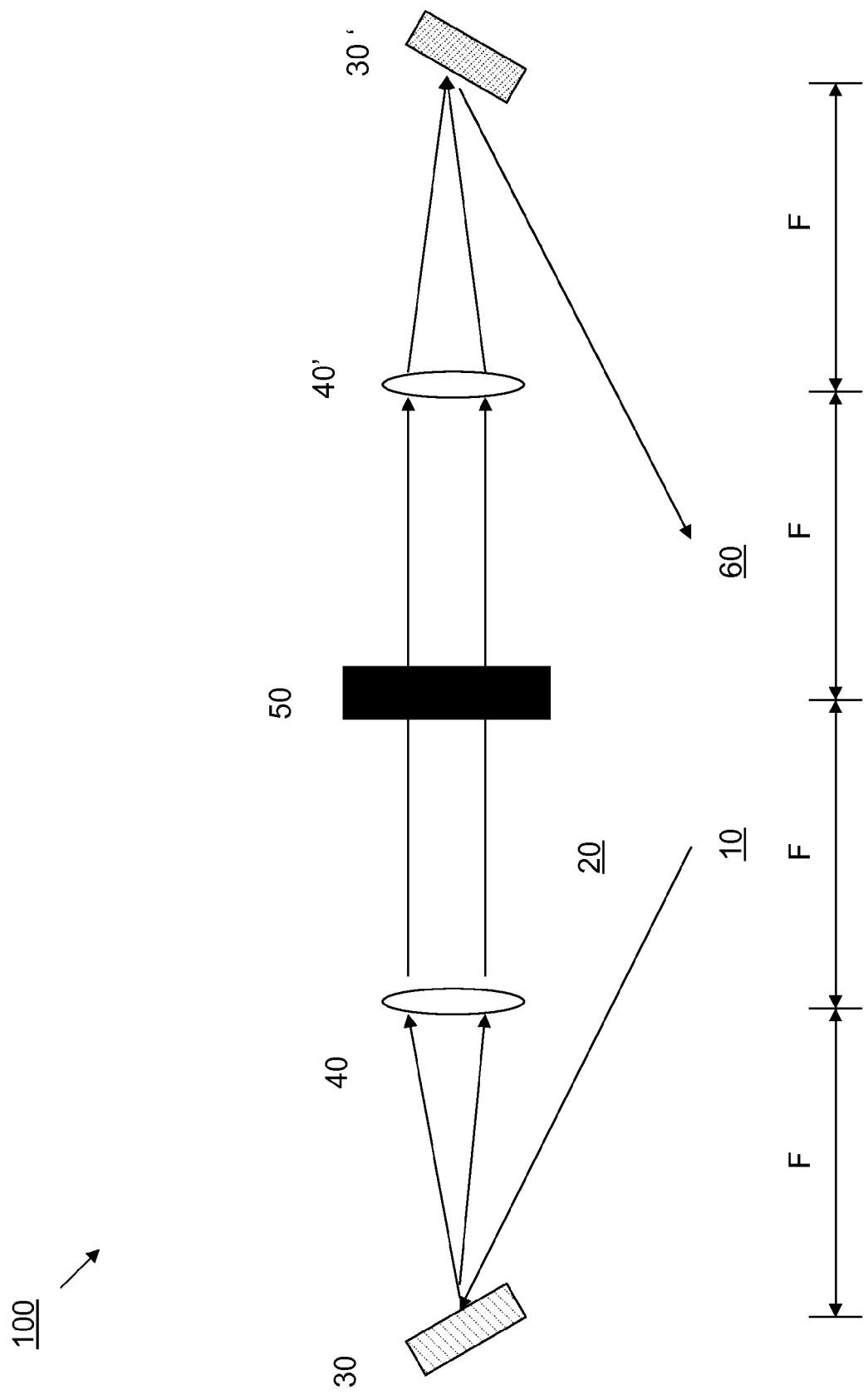
FIG. 1 illustrates an exemplary embodiment of a pulse shaper, in accordance with an embodiment.

FIG. 1 illustrates an exemplary embodiment of a pulse shaper, in which incoming light 10 is input to optical delay line 20. Optical delay line 20 generally includes a pair of dispersive element 30, 30', a pair of focusing element 40, 40', and a spatial light modulator 50 located at the Fourier plane F and which can be used to independently control and modulate the each of the phase, amplitude or polarization ellipticity of the pulse. Modulated outgoing light 60 may be output from optical delay line 20.

Dispersive element 30 is configured to resolve incoming light 10 into different constituent wavelength components which are subsequently focused via first focusing element 40 through spatial light modulator 50. The spatially modulated light emerging from spatial light modulator 50 is focused by second focusing element 40' onto second dispersive element 30' to reform coherent outgoing light 60.

Each of dispersive elements 30, 30' may include a diffractive grating, a holographic grating, a ruled grating, a prism or the like, which is configured to resolve incoming light into its various constituent components. In addition, one or more of dispersive element 30, 30' may be moveable by a motor or actuator so as to control the dispersion of light reflected from the dispersive elements 30, 30'. In some implementations, dispersive elements 30, 30' may be transparent or reflective.

Focusing elements 40, 40' may be conventional lens elements located in a Fourier plane F of dispersive elements 30, 30' respectively. First focusing element 40 focuses the incoming light rays at spatial light modulator 50. Second focusing element 40' focuses the modulated light rays onto second dispersive element 40'. Focusing elements 40, 40' may also include mirror elements. In some implementations, the pulse shaper may include more than one pair of focusing elements, such as an 8F or 12F system (still using 2 grating), where systems 51, 55, 57 are positioned in between their own pair of focusing elements, in a serial manner.

Figure 2:
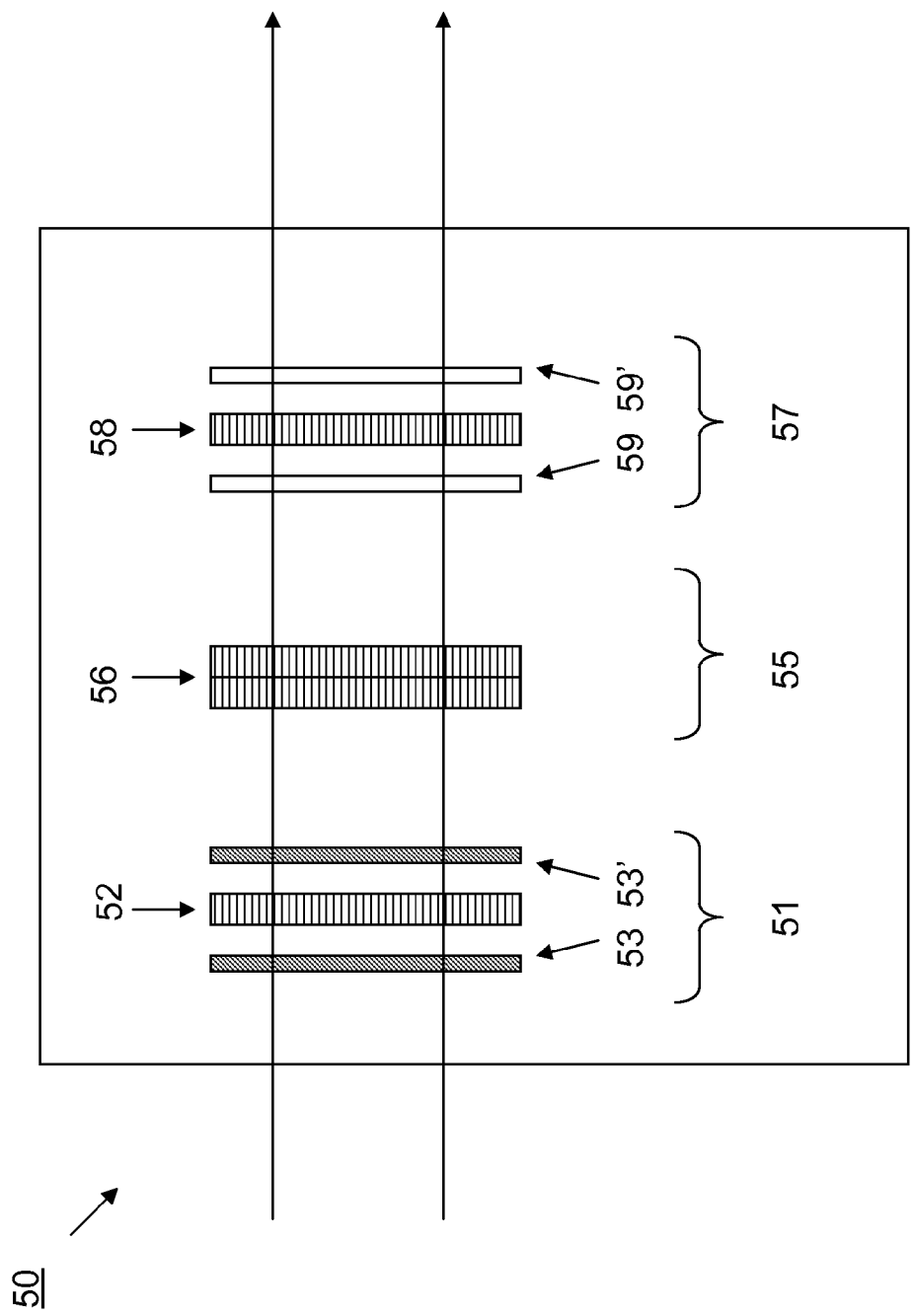
FIG. 2 illustrates a cross-sectional view of an exemplary spatial light modulator, in accordance with an embodiment.

FIG. 2 illustrates a cross-sectional view of an exemplary spatial light modulator 50, in accordance with an embodiment in which spatial light modulator 50 generally includes three systems 51, 55, 57. It will be appreciated that the order of the three systems shown in FIG. 2 is exemplary, and not to be construed as limiting. Other orders of the systems are possible.

Spatial light modulator 50 may be located at a Fourier plane F of focusing element 40, 40', as shown in FIG. 1. While FIG. 2 shows spaces between the system 51, 55, 57, it will be appreciated that these elements may be substantially formed together. Each of systems 51, 55, 57 may include an array of individually addressable light modulating elements under electronic control, such as liquid crystal displays (LCD).

First system 51 may include a spectral amplitude modulator device configured to modulate an amplitude of the optical pulse. In one implementation, single layer liquid crystal element array 52 may be placed between first and second linear polarizers 53, 53'. Liquid crystal array 52 may be configured such that the variable index axes is at approximately 45 degrees to the acceptance orientation of first linear polarizer 53. In accordance with an embodiment, controlling the index of refraction on the variable axes allows for amplitude modulation.

Second system 55 is a spectral phase and polarization ellipticity modulator. In one implementation, a dual layer liquid crystal element array 56 is provided. For example, the variable index axis of a first layer of the dual layer liquid crystal element may be located at approximately 45 degrees to the input polarization into the array and a second layer of the dual layer liquid crystal element array may have its variable index axis oriented substantially orthogonal to the first layer. In this configuration, dual layer liquid crystal element array 56 is configured to control both the relative phase of the light passing through a single element as well as the polarization ellipticity.

Third system 57 is a spectral polarization rotator configured to adjust the linear polarization of the optical pulse. In one implementation, a single layer liquid crystal element array 58 may be placed between first and second quarter-wave retardance waveplates 59, 59'. First waveplate 59 may have its fast axis parallel to the second polarizer 53 in the spectral amplitude modulator. In addition, the single layer liquid crystal element array 58 may be configured to have its variable axis rotated approximately 45 degrees from the fast axis of the first waveplate 59. Second waveplate 59' may have its fast axis oriented substantially orthogonal to the fast axis of first waveplate 59.

Figure 3:
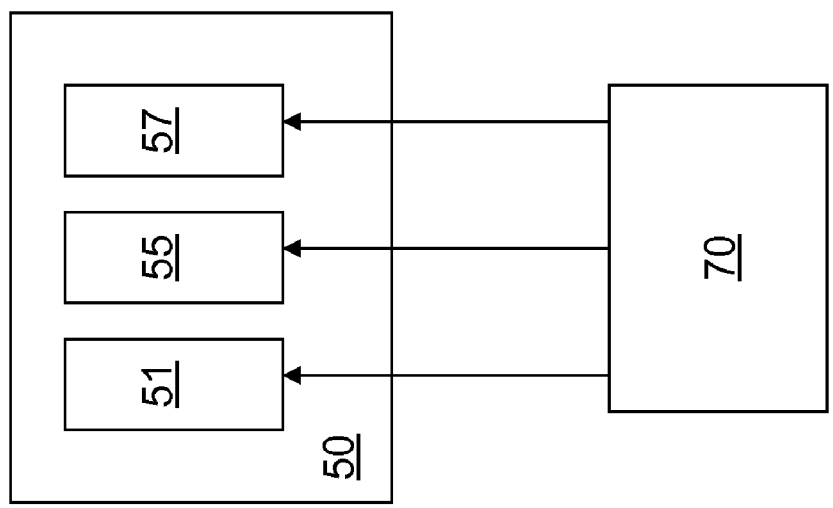
FIG. 3 illustrates an exemplary controller for controlling each of three systems, in accordance with an embodiment.

FIG. 3 illustrates an exemplary controller 70 for controlling each of three systems 51, 55, 57, in accordance with an embodiment.

Accordingly, spatial light modulator 50 may be used to modify an amplitude, a phase and a polarization of an optical pulse.

In one or more implementations, controller 70 may be dedicated hardware like Application Specific Integrated Circuits (ASIC) or Field Programmable Gate Arrays (FPGA), software (firmware), or a combination of dedicated hardware and software. For the different applications of the embodiments disclosed herein, the programming and/or configuration may vary.

Furthermore, according to the various embodiments disclosed in this application, the amplitude, the phase and the polarization of an optical pulse may be selectively modified independently for each pulse, in contrast to conventional approaches described above. Controller 70 may used known methodologies to control each of the amplitude, phase and polarization ellipticity.

While this disclosure has been described in connection with what is presently considered to be the most practical embodiments, it is to be understood that it is capable of further modifications and is not to be limited to the disclosed embodiments, and this application is intended to cover any variations, uses, equivalent arrangements or adaptations of the disclosure following, in general, the principles of the disclosure and including such departures from the present disclosure as come within known or customary practice in the art to which the application pertains, and as may be applied to the essential features hereinbefore set forth and followed in the spirit and scope of the appended claims.

What is claimed is:

1. An optical pulse shaper comprising:
   an optical delay line;
   a spatial light modulator placed at a Fourier plane of the optical delay line, the spatial light modulator comprising:
   a spectral amplitude spatial light modulator;
   a spectral phase and polarization ellipticity spatial light modulator; and
   a spectral polarization rotator, the spectral amplitude spatial light modulator, the spectral phase and polarization ellipticity spatial light modulator and the spectral polarization rotator being sequentially optically coupled together; and
   a controller coupled to the spatial light modulator and configured to independently control an amplitude, a phase and a polarization of an optical pulse using the spectral amplitude spatial light modulator, the spectral phase and polarization ellipticity spatial light modulator and the spectral polarization rotator.

2. The optical pulse shaper accordingly to claim 1, wherein the spectral amplitude spatial light modulator comprises an array of individually addressable light modulating elements and first and second linear polarizers, the array being located between the first and second linear polarizers.

3. The optical pulse shaper according to claim 2, wherein the array of individually addressable light modulating elements comprises a single layer liquid crystal array.

4. The optical pulse shaper accordingly to claim 1, wherein the spectral phase and the polarization ellipticity spatial light modulator includes an array of individually addressable light modulating elements.

5. The optical pulse shaper according to claim 4, wherein the array of individually addressable light modulating elements comprises a dual layer liquid crystal array.

6. The optical pulse shaper according to claim 5, wherein a variable index axis of a first layer of the dual layer liquid crystal array is oriented at approximately 45 degrees to an input polarization into the array, and a variable index axis of a second layer of the dual layer liquid crystal element array is oriented substantially orthogonal to the variable index axis of the first layer.

7. The optical pulse shaper accordingly to claim 1, wherein the spectral polarization rotator comprises an array of individually addressable light modulating elements and first and second quarter-wave waveplates, the array being located between the first and second quarter-wave waveplates.

8. The optical pulse shaper according to claim 7, wherein the array of individually addressable light modulating elements comprises a single layer liquid crystal array.

9. The optical pulse shaper according to claim 8, wherein a fast axis of the first waveplate is oriented parallel to an output polarizer in the spectral amplitude modulator.

10. The optical pulse shaper according to claim 8, wherein a variable axis of the single layer liquid crystal element array is rotated at approximately 45 degrees from a fast axis of the first waveplate, and a fast axis of the second waveplate is oriented substantially orthogonal to the fast axis of the first waveplate.

11. The optical pulse shaper according to claim 1, further comprising a pair of dispersive elements positioned in the optical delay line and arranged to resolve incoming light into different constituent wavelength components onto the spatial light modulator and to reform coherent outgoing light from the spatial light modulator.

12. The optical pulse shaper according to claim 11, wherein at least one of the dispersive elements comprises a holographic grating.

13. The optical pulse shaper according to claim 11, wherein at least one of the dispersive elements comprises a ruled grating.

14. The optical pulse shaper according to claim 11, wherein at least one of the dispersive elements comprises a prism.

15. The optical pulse shaper according to claim 11, wherein at least one of the dispersive elements is moveable relative to the spatial light modulator.

16. The optical pulse shaper according to claim 11, further comprising a pair of focusing elements positioned in the optical delay line between the pair of dispersive elements and the spatial light modulator.

17. The optical pulse shaper according to claim 16, wherein at least one of the focusing elements comprises a lens.

18. The optical pulse shaper according to claim 16, wherein at least one of the focusing elements comprises a mirror.

19. A method of shaping an optical pulse using an optical delay line and comprising:
dispersing the optical pulse into constituent frequency components;
focusing the constituent frequency components along one optical path onto a spatial light modulator located at a Fourier plane of the optical delay line;
independently controlling an amplitude, a phase and a polarization of the constituent frequency components of the optical pulse with the spatial light modulator; and
reforming coherent outgoing light from the spatial light modulator into a shaped optical pulse.

20. The method according to claim 19, wherein the spatial light modulator includes a spectral amplitude spatial light modulator, a spectral phase and polarization ellipticity spatial light modulator, and a spectral polarization rotator, and wherein independently controlling the amplitude, the phase and the polarization of the constituent frequency components of the optical pulse with the spatial light modulator includes:
modulating an amplitude of the constituent frequency components using the spectral amplitude spatial light modulator;
controlling a relative phase and a polarization ellipticity of the constituent frequency components using the spectral phase and polarization ellipticity spatial light modulator; and
adjusting a linear polarization of the constituent frequency components using the spectral polarization rotator.

* * * * *